United States Patent [19]

Kohan

[11] 3,960,984
[45] June 1, 1976

[54] COMPOSITION OF OXYMETHYLENE POLYMER AND AMIDE OLIGOMERS

[75] Inventor: Melvin Ira Kohan, Wilmington, Del.

[73] Assignee: E. I. Du Pont de Nemours and Company, Wilmington, Del.

[22] Filed: Apr. 16, 1974

[21] Appl. No.: 461,388

[52] U.S. Cl. .......................... 260/857 F; 260/67 FP
[51] Int. Cl.² .................................................. C08L 77/02
[58] Field of Search ........................... 260/857 OX

[56] References Cited
UNITED STATES PATENTS

| | | | |
|---|---|---|---|
| 2,174,527 | 10/1939 | Peterson | 260/78 R |
| 2,993,025 | 7/1961 | Alsup | 260/857 O X |
| 3,355,514 | 11/1967 | De Walle | 260/857 O X |
| 3,444,265 | 5/1969 | O'Brien | 260/857 O X |
| 3,592,873 | 7/1971 | Ishida | 260/857 O X |

FOREIGN PATENTS OR APPLICATIONS

| | | |
|---|---|---|
| 47-25243 | 10/1972 | Japan |
| 1,346,026 | 2/1974 | United Kingdom ......... 260/857 O X |

*Primary Examiner*—Murray Tillman
*Assistant Examiner*—W. C. Danison, Jr.

[57] ABSTRACT

A composition with high thermal stability possessing superior resistance to mold and die deposits comprises (A) an oxymethylene homopolymer or copolymer and (B) 0.01 to 10% by weight of an amide oligomer having a molecular weight of 800 to 10,000 and wherein the active ends (based upon either amine or acid terminal groups) of the oligomer constitute no more than 0.02 mole % of the formaldehyde segments in the oxymethylene polymer.

19 Claims, 2 Drawing Figures

COMPOSITION OF OXYMETHYLENE POLYMER AND AMIDE OLIGOMERS

BACKGROUND OF THE INVENTION

The present invention is directed to oxymethylene homopolymers and copolymers. More specifically, the present disclosure pertains to polyoxymethylene compositions which posses thermal stability and resistance to mold and die deposits.

The prior art has been extensively developed in the field of oxymethylene homopolymers and copolymers which are thermally stable and which are present in compositions that contain additives such as polyamides or superpolyamides.

In Alsup et al. U.S. Pat. No. 2,993,025 issued July 18, 1961, high thermal stability is provided into a polyoxymethylene composition by incorporation of 0.001% to 50% by weight of a superpolyamide such as nylons in which is present the carbonamide linkage

with R defining hydrogen, alkyl or alkoxy. The superpolyamide has a preferred degree of polymerization of about 100 to 200 and upon hydrolysis yields monomeric compounds of (1) mixtures of dicarboxylic acids and diamines and/or (2) omegaaminomonocarboxylic acids.

In Herman et al. U.S. Pat. No. 3,131,165 issued Apr. 28, 1964, is found a teaching of stabilizing formaldehyde polymers with primary and secondary amides of polybasic acids including oxalic acid diamide and compounds of the formula $R(CONHR_1)_n$ with R representing a polyvalent alkyl, cycloalkyl, aryl, aralkyl or a heterocyclic radical and the substitution products of these radicals, $R_1$ is a hydrogen atom or an alkyl or cycloalkyl radical having a molecular weight of up to 500, or the substitution products of these radicals, and n represents a whole number of at least 2 and preferably 2 to 4.

In Fourcade et al., U.S. Pat. No. 3,306,953 issued Feb. 28, 1967, is disclosed stabilization of polyoxymethylene by addition of a 0.5 to 2.0% by weight of a polyamide obtained by the condensation of a dimer or trimer of an unsaturated fatty acid containing at least 10 carbon atoms with at least a stoichiometric quantity of a diamine or a triamine.

In O'Brien et al. U.S. Pat. No. 3,444,265 issued May 13, 1969, is disclosed an oxymethylene copolymer composition with improved high temperature stability by incorporation of a thermoplastic linear polycarbonamide and a solid fusible diphenylamine-acetone condensation product. Within the disclosure of the types of linear polyamides which are suitable are those having a molecular weight above 1000 although only nylon is demonstrated.

In British Patent Specification No. 1,346,026 published Feb. 6, 1974, is set forth formation of a polyacetal composition having high resistance to thermal decomposition and discoloration at high temperatures. Disclosed in the composition is a polyamide which is a polycondensation product of (A) $H_2NRNH_2$ where R is an aliphatic, alicyclic, or aromatic hydrocarbon group or groups of hydrocarbons combined by oxygen or sulfur atoms; (B) $XOCCH_2COX$ where X are hydroxyl groups, halogen atoms or lower alkoxy groups and (C) $YCH_2COX$ where X is as previously defined and Y is a cyano or carbamoyl group. The ratio of components (A), (B), (C) is not limited but it is preferable that each of (A) and (B) is in an amount of 1 to 30 moles with respect to 1 mole of (C). Molecular weights of the order of 300 to 100,000 and preferably 450 to 5,000 are disclosed in relationship to the polyamide.

SUMMARY OF THE INVENTION

This disclosure is directed to molding and extrusion compositions with high thermal stability. These compositions contain high molecular weight homopolymers and copolymers of oxymethylene in conjunction with an amide oligomer.

In molding or extruding with the oxymethylene polymer compositions which contain superpolyamides as stabilizers, it is known that mold or die deposits may occur in a relatively brief time period resulting in a necessity to clean the mold or die. As a direct replacement for the superpolyamide stabilizer, the inclusion of amide oligomer in an amount of 0.01 to 10% by weight in the molding composition (based on the weight of polyoxymethylene and oligomer) substantially reduces this tendency for rapid buildup of undesirable deposits. A more nearly optimum weight will be of the order of 0.1 to 7%. For most melt processing applications, a most desirable range will be 0.2 to 5% in both the oxymethylene homopolymer and copolymer compositions.

Both homopolymers and copolymers of oxymethylene are well known in the prior art as containing a repeating series of methylene to oxygen linkages of the formula $-(CH_2O)-$. Additionally, in accordance with well-known teachings, these polymers are capped or in other words contain terminal groups for added stability.

In the present invention, an amide oligomer is necessary which will denote structures comprised of carboxamides with an average number of amides per molecule of not more than 90. The average molecular weight of the oligomer chain will be between 800 and 10,000. Oligomer is employed in a context broader than the common definition of only a small number of repeating units. However, the terminology emphasizes a significant difference in comparison to the prior art use of high molecular weight superpolyamides which are commonly known as nylons.

Additionally, it is required that the amide oligomer does not introduce an excessive amount of active ends into the polyoxymethylene composition. An active end is defined herein as the higher concentration of either (1) an acid terminal group namely carboxylic acid or the corresponding acid halide or acid anhydride or (2) a basic terminal group namely an amine. An excess amount of active ends will result in destabilization of the polymer composition with decomposition of the oxymethylene polymer, or at least no improvement in stabilization. These active ends should constitute no more than 0.02 mole % of the formaldehyde segments in the oxymethylene polymer. In molding or extrusion where added chemical stability is necessary, the active oligomer ends preferably will constitute not more than 0.015 mole % of the formaldehyde segments in the oxymethylene polymer. A maximum number of active ends of 0.01 mole % may be desirable in specific melt processing applications; a reduction below this number does not generally result in added thermal stability in the molding or extrusion composition.

It is a purpose of the present invention to impart thermal stability to an oxymethylene polymer compositions while overcoming the disadvantage of oxymethylene homopolymer and copolymer molding compositions containing superpolyamides that cause excessive mold and die deposits.

DETAILED DESCRIPTION OF THE INVENTION

Figure 1:
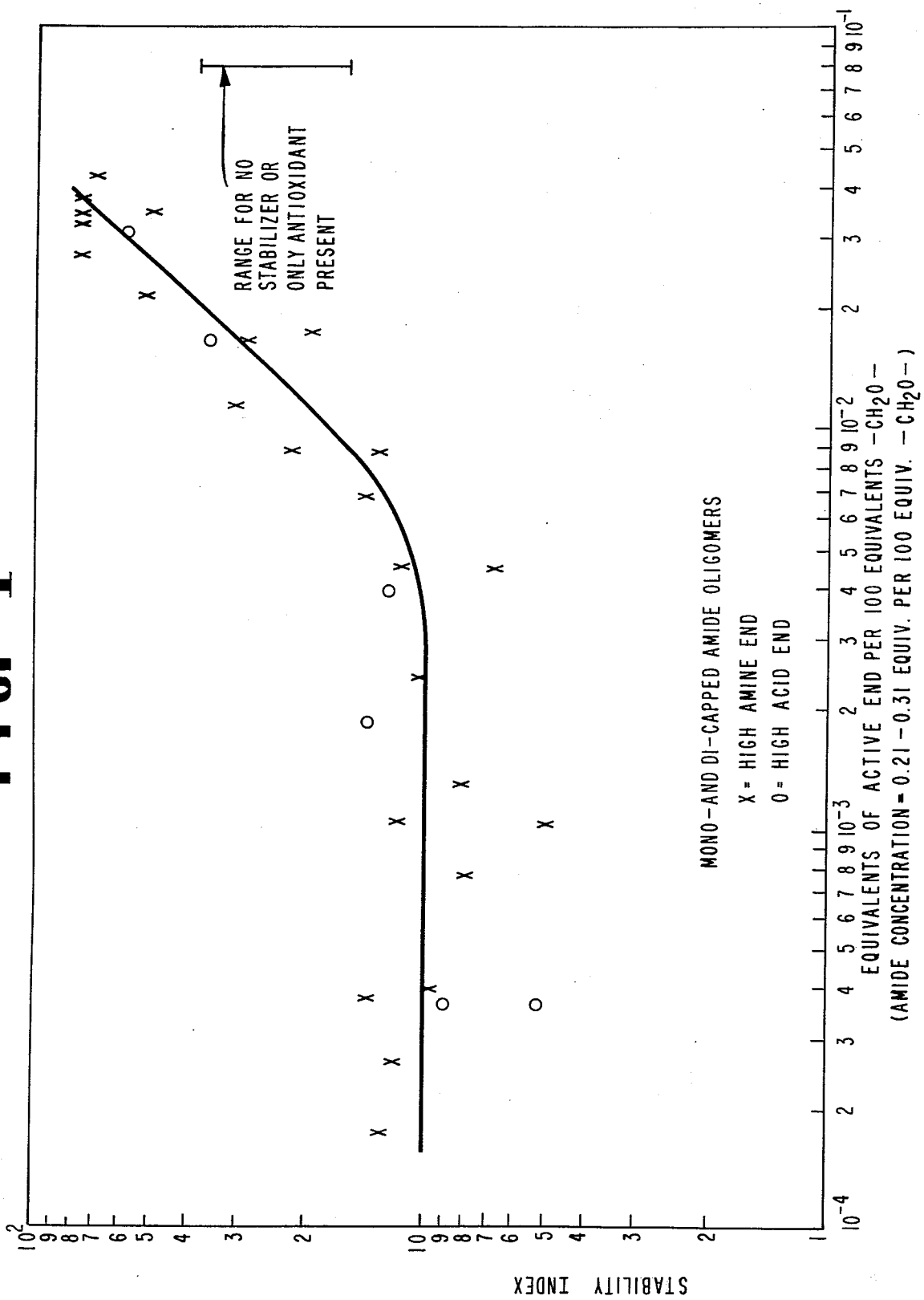

The types of oxymethylene homopolymers and copolymers suitable in the present disclosure are well known in the art. As employed herein, formaldehyde segments will consitute at least 60% of the molecular weight of the polymer. It is a requirement for the oxymethylene polymers that the terminal hydroxyl groups be capped to avoid depolymerization such as at elevated temperatures causing release of formaldehyde. It is known to avoid degradation by esterification or etherification of these groups. Reference oxymethylene polymers suitable herein with stable terminal groups are disclosed in U.S. Pat. No. 2,993,025; 3,743,614; 3,787,353 and 3,795,715. Therefore, in the present context oxymethylene homopolymers and copolymers are defined to be inclusive of polymers stabilized against degradation by reaction of end groups.

In addition to the capping of oxymethylene polymer in the molding or extrusion composition, use of an amide oligomer is required to impart improved stability coupled with resistance to formation of deposits in molds and dies.

The prior art is extensive with disclosure of superpolyamides as additives for polyoxymethylene compositions particularly for the purpose of increasing thermal stability. These polyamides are high molecular weight polymers with the number of amides per molecule preferably greatr than 100 and a molecular weight of at least 12,000. An exception to this general requirement is found in U.S. Pat. No. 3,444,265 wherein in an oxymethylene copolymer composition, a polyamide may be incorporated having a molecular weight of above 1,000 in combination with a fusible diphenylamine-acetone condensation product. However, closer examination of this teaching in Example 1 (the sole Example) reveals use of a nylon-66/nylon-610/nylon-6 terpolyamide sold by E. I. du Pont de Nemours and Company as Zytel 61. The molecular weight of this polyamide is of the order of 25,000. This patent additionally demonstrates the undesirability of employment of oxymethylene homopolymers with the polyamide. Another exception to the general requirement of a disclosure of high molecular weight polyamide in an oxymethylene composition is in British Patent Specification 1,346,026. Preferred molecular weights of 450 to 5,000 are disclosed in formation of a condensation product of three components wherein criticality exists in selection of each component. There is no realization of the necessity of capping of the ends of the amide chain in comparison to the present disclosure. Also, in the present invention there is no criticality in the reactants to form the amide oligomer so long as low molecular weight results and excess active groups are capped.

In contrast to conventional superpolyamides, the amide oligomers of the present disclosure are of relatively low molecular weight with an average number of amides per molecule of not more than 90. Distinguishing from the prior art of superpolyamides, the amides employed herein are considered to be closer in character to oligomers. This character is true even though molecular weights as high as 10,000 may be employed although an uppermost molecular weight of 7,000 is generally satisfactory. As disclosed in Zahn et al., Angewandte Chemie, International Ed. (English) 2, 410 (1963), oligomer would not be an accurately correct scientifically technical term particularly for molecular weights of about 2,000 and upwards. In this article is suggested a new name "pleionomers" for low molecular weight substances in the molecular weight region between polymers and oligomers. However, since the term "pleionomer" is not generally accepted, the term "oligomer" is considered suitable in the present context. In other words, although high molecular weight polyamides are directly employed in oxymethylene polymer compositions, there is no general disclosure (with several isolated exceptions) of amide molecular weights of the order disclosed herein.

More particularly concerning the structure of the amide oligomer, carboxamide linkages will be present as integral portions of the oligomer chain. These linkages

upon hydrolysis yield compounds of (1) mixtures of dicarboxylic acids and diamines, and/or (2) omega-amino-monocarboxylic acids. These compounds with the exception of capping groups would be the sole hydrolysis products for linear amide oligomers. With a branched oligomer, additional hydrolysis products would include a polybasic acid or polyamine with a functionality greater than two. Reference is directed to the definition found in U.S. Pat. No. 2,993,025 wherein hydrolysis products of high molecular weight nylons would also yield compounds of (1) mixtures of dicarboxylic acids and diamines and/or (2) omega-aminocarboxylic acids.

Additionally, reference may be made to the definition of "polyamide resin" found in Encyclopedia of Chemistry, Third Edition, pp. 874 to 876, 1971. This definition would hold true for amide oligomer with the modification of molecular weight (which may be expressed as the degree of polymerization). Generally, linear amide oligomers are most desirable in the present disclosure.

In addition to the significantly different molecular weight of the amide oligomer, another critical aspect and point of differentiation over the prior art is the necessity for a minimum number of active ends. An "active end" is defined herein as the higher concentration in the amide oligomer of either (1) an acid terminal group namely carboxylic acid or the corresponding acid halide or acid anhydride or (2) a basic terminal group namely an amine. In the present definition it is understood that end or terminal is inclusive of a branched group that is not a portion of the backbone chain. Illustratively, a branched group will occur when a triamine is employed as a reactant in formation of the oligomer. The amide oligomer should contain active end groups in an amount no more than 0.02 mole % of the formaldehyde segments in the oxymethylene polymer. A more desirable range will be no more than 0.015. For maximum thermal stability necessary in some melt processing applications, the active ends will be present in an amount no more than 0.01 mole % of the formaldehyde segmennts in the oxymethylene polymer.

Figure 2:
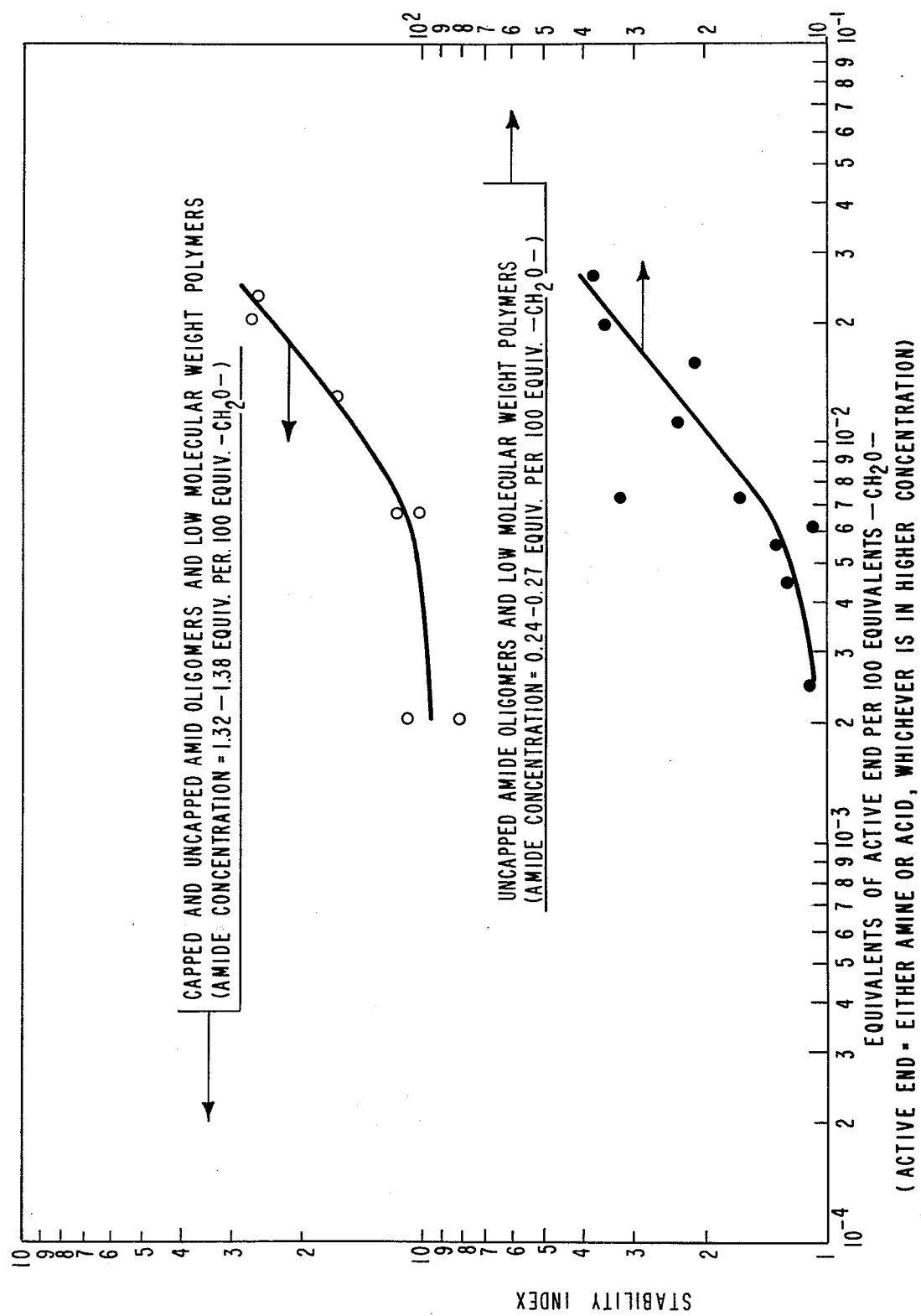

A maximum number of active end groups on the oligomer chain in relationship to formaldehyde segments is necessary to render the oxymethylene polymer composition as thermally stable and obtain a reduction of mold and die deposits. As will be more fully demonstrated through Examples 1-1 to 1-28 and Examples 2-1 to 2-25, the thermal stability (expressed as Stability Index) may be correlated with equivalents of active ends of the higher concentration of either acid or amine for each equivalent of —$CH_2O$—. FIG. 1 and FIG. 2 are graphs of numerical values obtained. It has been found that with both acid and amine groups present, the higher concentration of either the acid or amine end will determine the suitability of the oligomer to impart thermal stability to the oxymethylene composition. The remaining groups if present at a lower concentration do not effect the general suitability of the composition.

With an active end referred to herein as the greater concentration of either acid or amine groups, capping in contrast is employed herein to denote the absence of the acid or amine groups. Uncapped denotes the presence of amine and/or acid groups on both ends of the oligomer chain. Monocapped refers to the presence of one acid or amine group on the oligomer chain with a capping group present at the other end of the chain. An amide oligomer with both ends capped is refered to herein as dicapped.

The following reactions are illustrative of the procedures for formation of uncapped, monocapped or dicapped amide oligomers.

To obtain an uncapped oligomer, reaction may be undertaken with a lactam and water or a diamine and a dibasic carboxylic acid. In the case of the reaction of the diamine and diacid, if one reactant is employed in excess the corresponding amine or acid end groups will be on both ends of the amide oligomer.

Monocapped linear amide oligomers which contain only one amine or acid end may be formed by reaction of a lactam and either a monoamine or monobasic carboxylic acid. One amine or acid end will be present in reaction of a lactam with a diamine or a diacid if additionally, one mole of monobasic carboxylic acid is employed for one mole of diamine reactant or one mole of monoamine is employed for one mole of dibasic carboxylic acid.

Dicapped amide oligomers may be formed in one step by employment of specific reactants in correct molar ratios or in a two-step procedure by formation of the uncapped or monocapped amide oligomer followed by capping of the amine or acid ends. Illustratively, a one-step procedure may involve reaction of a lactam and a 1:1 molar ratio of a monoamine and a monobasic carboxylic acid. A diamine or dibasic carboxylic acid may be employed in reaction with the lactam together with an amount of monoamine equivalent to the diacid or an amount of monobasic carboxylic acid equivalent to the diamine.

In a two-step procedure, the uncapped or monocapped amide oligomer is formed as previously discussed. The presence of amine or acid groups will determine the choice of capping reactants.

Desirable capping groups for the amine ends include monobasic carboxylic acids or derivatives such as anhydrides or acyl halides which will result in an amide; dibasic carboxylic acids or derivatives such as dihalides or cyclic anhydrides to give an imide; and ureas which yield via deamination substituted ureas, e.g., N-phenylurea which yields the corresponding N,N'-disubstituted urea.

Desirable capping groups for the acid ends include amino compounds with at least one hydrogen on the nitrogen atom, e.g., butylamine and pentamethyleneimine; orthoaromatic diamines yielding an imidazoline such as orthophenylenediamine; ortho-aromatic hydroxyamines yielding an oxazoline such as 2-aminophenol; alcohols yielding an ester; and isocyanates yielding via dicarboxylation an amide (the nondecarboxylated reaction product of the isocyanate is also neutral).

The disclosed amide oligomers overcome the need of high molecular weight polyamides to provide thermal stability in the oxymethylene polymer composition. Thermal stability is provided in the composition by the use of the capped oligomer. In addition, the capped oligomer is vastly superior to high molecular weight polyamides in preventing rapid buildup of deposits in molds and dies. A high percentage of reactive ends in polyamides denotes ineffective results or instability in the molding or extrusion composition unless the polyamide is present at a high molecular weight.

In comparison, the disclosed amide oligomers at molecular weights of 10,000 and less and more preferably 7,000 and less will impart thermal stability to the molding or extrusion composition. An increase in molecular weight of the amide will result in good thermal stabilization of the oxymethylene polymer but with the disadvantage of an increase in mold and die deposits.

Concerning the lower limit of molecular weight of the amide oligomer for the purpose of explanation only and without being bound to any theory, it is considered necessary for the oligomer to be insoluble in the polyoxymethylene blend. A minimum molecular weight assures adequate insolubility. This characteristic will not be generally obtained at very low molecular weights.

From the standpoint of processability, the oligomers are considered to effect a good comprise between a low melting point for the purpose of obtaining good dispersion coupled with a high melting point for the purpose of minimizing sticking and contamination. Additionally, due to lower molecular weights gelation is less of a problem in comparison to use of high molecular weight superamides.

Commerical processing techniques encompass a wide variety of machines and conditions with a variety of polyoxymethylenes. Therefore, optimum molecular weights for amide oligomers within the range disclosed can be expected to vary dependent on the exact conditions of use. What is very clear, however, is that capped oligomers permit attainment of excellent stabilization with major reduction in or elimination of deposits that have been characteristic of the known, heretofore used superpolyamides.

As is well known in the art, the oxymethylene polymer composition may contain conventional additives including antioxidants, plasticizers, stabilizers, lubricants, pigments, etc. Uniformity of the components in the molding composition is desirable and well known mixing techniques may be used including single and twin screw extrusion, solution blending, milling, etc.

To further illustrate the innovative aspects of the present invention, the following examples are provided.

EXAMPLES 1—1 to 1–28

General Procedures For Formation of Amide Oligomer

In a shaker tube lined with an inert material, such as glass, monocapped amide oligomers were prepared by reaction of caprolactam or laurolactam with a monoamine or monobasic acid (except Example 1–24). After purging the chilled vessel of air by successive evacuations and pressurizations with nitrogen, the tube was shaken under autogenous pressure for 8–16 hours at 250°–275°C. The tube was brought to ambient temperature, and the product removed and fragmented. Acetone or methanol extraction and drying in a vacuum oven yielded the monocapped oligomer. End group analysis for amine or acid ends (depending on the monofunctional reactant employed) permitted estimation of the number-average molecular weight ($\overline{M}_n$) via the equation:

$$\overline{M}_n = 1 \times 10^6 / \text{active end in equivalents per } 10^6 \text{ g}.$$

The reactants and mole ratios to form the monocapped products of these Examples are given in Table 1.

The monocapped, amine-terminated oligomers were converted to their dicapped derivatives by acetylation. Typically, 20–25 g of monocapped oligomer was dissolved in 100 to 150 ml of glacial acetic acid containing 2.5 g of sodium acetate, and 7.0 to 9.0 ml of acetic anhydride was then added. After heating on a steam bath for 1 to 3 hours, the product was poured onto ice water. The precipitate was washed several times with water and was stirred or refluxed with hot water prior to a final filtration and drying. End group analysis was used to confirm acetylation. The percentage of capped ends is as follows:

$$\% \text{ capped ends} = 100 - \frac{\overline{M}_n}{10^4} \times \frac{\text{sum of active ends}}{2}.$$

The acetylated Examples are listed in Table 1.

Illustrative Procedure for Formation of Amide Oligomer

In Example 1–4, 100 g of caprolactam and 10 g of n-hexyl amine (8.9/1 mole ratio) were allowed to react in a 400-ml stainless steel tube for 16 hours at 250°C. Washing with acetone in a household-type blender, filtering, and drying yielded a product with 706 amine ends per $10^6$g and a $\overline{M}_n$ of approximately 1440. The hexyl amine contributes 101 to the molecular weight so that the number of caprolactam molecules is, on the average, 1340/113 or 11.8. Some loss of amine during reaction is indicated. For a monocapped oligomer the average number of amide groups per molecule is equal to the number of monomer units per molecule and is also, therefore, 11.8.

In Examples 1–25 to 1–28 where the monomer was laurolactam, the same procedure was employed except that small amounts of water were added to the charge which was heated at 300°C. for 16 hours.

In the acetylation procedure of Examples 1–26 and 1–28, 25 g of the amine-terminated oligomer in 350 ml of glacial acetic acid containing 3.5 to 7.0 g of sodium acetate and 10 to 20 ml of acetic anhydride was heated for 3 to 3.5 hours before precipitating, washing, and drying.

For Example 1–24, an 80 weight percent aqueous solution of caprolactam, a 90 percent solution of hexamethylene diamine, and acetic acid in the mole ratio of 32.5/1/2.95 were charged to a heated pressure vessel equipped with a stirrer. The batch was heated until the pressure reached 250 psig and heating continued while withdrawing water to maintain the pressure. When the temperature reached 250°C., water was removed such that the pressure steadily decreased and the temperature steadily rose to 265°C. After reaching atmospheric pressure the batch was held at 265°C. under one atmosphere of steam for 30 minutes. The stirrer was turned off, and the contents of the vessel were allowed to drain into a large container of water. Fragmentation and drying yield a product with an excess of acid ends.

Table 1

Ingredients for Monocapped Oligomers and Acetylated Derivatives

| Example | Monomer | Capping Group | Mole Ratio of Ingredients Lactam/Capping Group | Acetylated Dicapped Derivative |
|---|---|---|---|---|
| 1-1 | Caprolactam | n-Hexylamine | 4.4/1 | 1-2, 1-3 |
| 1-4 | " | " | 8.9/1 | 1-5 |
| 1-6 | " | " | 10.6/1 | 1-7 |
| 1-8 | " | " | 17.7/1 | 1-9 |
| 1-10 | " | " | 30/1 | 1-11, 1-12 |
| 1-13 | " | n-Octylamine | 35/1 | 1-14 |
| 1-15 | " | " | 55/1 | 1-16 |
| 1-17 | " | n-Butylamine | 4.4/1 | 1-18 |
| 1-19 | " | n-Octadecylamine | 4.4/1 | 1-20 |
| 1-21, 1-22 | " | Acetic Acid | 15/1 | — |
| 1-23 | " | " | 4.4/1 | — |
| 1-25 | Laurolactam | n-Hexylamine | 3.3/1/0.15H$_2$O | 1-26 |
| 1-27 | " | " | 16.7/1/1 H$_2$O | 1-28 |

Formation of Polyoxymethylene Blend

The polyoxymethylene (POM) used in the blends was a homopolymer with acetate end groups and a number-average molecular weight of about 40,000. A dry blend was prepared from 0.125 parts by weight of 2,2'-methylene-bis-(6-tertiary-butyl-4-methylphenol) as antioxidant, X parts of oligomer, and (100-X-0.125) parts of POM. Thus, the percentages given in Table 2 are based on the total weight of the blend. The dry blend was melted and mixed by extrusion using a 1-inch or 2-inch diameter single screw extruder equipped with a die having one or two approximately ¼-inch diameter holes. Melt temperatures were 210°–220°C. The extruded strand was pulled through a short tap-water quench, blown with air to remove the surface water, and fed into a cutter that yielded particulate granules approximating a right cylinder with an average diameter of about ⅛ inch. The granules were hot after cutting and were cooled under nitrogen to yield a product suitable for test without further treatment.

Thermal Stability Measurement

The thermal stability of the blends was determined by measuring the volume of gas evolved per one half gram of blend between the fifth and thirtieth minute of heating at 259°C. in a nitrogen atmosphere. A 0.5-gram charge in a 50-cc syringe was used. Readings of linear displacement were taken with a cathetometer every 5 minutes to check plunger displacement versus time and assure the absence of leaks or a tight plunger that would not move or did so unevenly. This also permitted extrapolation to a 30-minute value if an unstable sample caused the maximum allowable displacement before 30 minutes. The linear displacement in centimeters multiplied by 6.3 gave, per one half gram of blend, the volume in cubic centimeters of evolved gas at room temperature. The factor is determined by the temperature of the test and the diameter of the syringe. The volume thus determined is the Stability Index (SI).

Summary of Data

Table 2 summarizes the data for the blends. Described are the type amide employed (mono- or di-capped) with the type of capping group if present, the active end of the amide in equivalents per $10^6$ gram, the number-average molecular weight ($\overline{M}_n$) of the amide oligomer, and the number of amide groups in the oligomer molecule. The weight percent of amide employed, the amide and active ends in equivalents/100 eq. $CH_2O$ and the Stability Index are also given for the blend.

Table 2

| Example | Type Amide | Capping Groups A | B | Active Ends (equiv./$10^6$g) $NH_2$ | COOH | $\overline{M}_n$ | No. Amides per molecule |
|---|---|---|---|---|---|---|---|
| 1-1 | $A\dashv NH(CH_2)_5CO\vdash_n B$ | H-(uncapped) | $n-C_6H_{13}NH-$ | 1163 | 9.1 | 860 | 6.7 |
| 1-2 | " | $CH_3CO-$ | " | 63.6 | low | 900 | 7.7 |
| 1-3 | " | " | " | " | " | " | " |
| 1-4 | " | H-(uncapped) | " | 706 | 7.5 | 1440 | 11.8 |
| 1-5 | " | $CH_3CO-$ | " | 78.4 | 25.0 | 1480 | 12.8 |
| 1-6 | " | H-(uncapped) | " | 572 | low | 1750 | 14.5 |
| 1-7 | " | $CH_3CO-$ | " | 13.0 | 7.5 | 1790 | 15.5 |
| 1-8 | " | H-(uncapped) | " | 407 | 14.8 | 2460 | 20.9 |
| 1-9 | " | $CH_3CO-$ | " | 42.8 | low | 2500 | 21.9 |
| 1-10 | " | H-(uncapped) | " | 289 | 7.1 | 3450 | 29.6 |
| 1-11 | " | $CH_3CO-$ | " | 25.2 | low | 3490 | 30.6 |
| 1-12 | " | " | " | " | " | " | " |
| 1-13 | " | H-(uncapped) | $n-C_8H_{17}NH-$ | 230 | low | 4350 | 37.3 |
| 1-14 | " | $CH_3CO-$ | " | 11.4 | 12.1 | 4390 | 38.3 |
| 1-15 | " | H-(uncapped) | " | 149 | low | 6710 | 58.2 |
| 1-16 | " | $CH_3CO-$ | " | 22.6 | 35.0 | 6750 | 59.2 |
| 1-17 | " | H-(uncapped) | $n-C_4H_9NH-$ | 1237 | low | 810 | 6.5 |
| 1-18 | " | $CH_3CO-$ | " | 8.5 | low | 850 | 7.5 |
| 1-19 | " | H-(uncapped) | $n-C_{18}H_{37}NH-$ | 1076 | low | 930 | 6.3 |
| 1-20 | " | $CH_3CO-$ | " | 12.4 | low | 970 | 7.3 |
| 1-21 | " | $CH_3CO-$ | HO-(uncapped) | 14.1 | 540 | 1850 | 15.2 |
| 1-22 | " | " | " | " | " | " | " |
| 1-23 | " | $CH_3CO-$ | HO-(uncapped) | 25.9 | 1010 | 990 | 7.6 |
| 1-24 | $A\rightarrow NH(CH_2)_5CO\vdash_n NH(CH_2)_6NH\dashv CO(CH_2)_5NH\vdash_n A$ | $A=CH_3CO-$ | | 17.5 | 130 | 2700 | 22.5 |
| 1-25 | $A\dashv NH(CH_2)_{11}CO\vdash_n B$ | H-(uncapped) | $n-C_6H_{13}NH-$ | 737 | 4.2 | 1360 | 6.4 |
| 1-26 | " | $CH_3CO-$ | " | 3.0 | low | 1400 | 7.4 |
| 1-27 | " | H-(uncapped) | " | 284 | 12.6 | 3520 | 17.4 |
| 1-28 | " | $CH_3CO-$ | " | 4.9 | 31.8 | 3560 | 18.4 |

| Example | Wt.% | Conc'n. in POM Blend (equiv./100eq.$CH_2O$) Amide | Active end | Stability Index |
|---|---|---|---|---|
| 1-1 | 1.0 | 0.24 | $3.52\times10^{-2}$ | >75, 49.8 |
| 1-2 | 1.0 | 0.26 | $1.93\times10^{-3}$ | 10.8, 8.9 |
| 1-3 | 0.5 | 0.13 | $9.65\times10^{-4}$ | 13.4 |
| 1-4 | 1.0 | 0.25 | $2.14\times10^{-2}$ | 51.8 |
| 1-5 | 1.0 | 0.26 | $2.38\times10^{-3}$ | 10.4 |
| 1-6 | 1.0 | 0.25 | $1.73\times10^{-2}$ | 19.6 |
| 1-7 | 1.0 | 0.26 | $3.94\times10^{-4}$ | 9.7 |
| 1-8 | 1.0 | 0.26 | $1.23\times10^{-2}$ | 30.6 |
| 1-9 | 1.0 | 0.27 | $1.30\times10^{-3}$ | 8.3 |
| 1-10 | 1.0 | 0.26 | $8.76\times10^{-3}$ | 22.0, 13.2 |
| 1-11 | 1.0 | 0.27 | $7.64\times10^{-4}$ | 7.9 |
| 1-12 | 0.5 | 0.13 | $3.82\times10^{-4}$ | 10.7 |
| 1-13 | 1.0 | 0.26 | $6.97\times10^{-3}$ | 14.4, 8.4 |
| 1-14 | 1.0 | 0.26 | $3.67\times10^{-4}$ | 8.9, 5.2 |
| 1-15 | 1.0 | 0.26 | $4.52\times10^{-3}$ | 11.3, 6.9 |
| 1-16 | 1.0 | 0.27 | $1.06\times10^{-3}$ | 11.7, 5.0 |
| 1-17 | 1.0 | 0.24 | $3.75\times10^{-2}$ | >75 |
| 1-18 | 1.0 | 0.27 | $2.58\times10^{-4}$ | 11.9 |
| 1-19 | 1.0 | 0.21 | $3.26\times10^{-2}$ | >75 |
| 1-20 | 1.0 | 0.23 | $3.76\times10^{-4}$ | 14.0 |
| 1-21 | 1.0 | 0.25 | $1.64\times10^{-2}$ | 36.1 |
| 1-22 | 0.5 | 0.12 | $8.20\times10^{-3}$ | 24.9 |
| 1-23 | 1.0 | 0.23 | $3.06\times10^{-2}$ | 57 |
| 1-24 | 1.0 | 0.25 | $3.94\times10^{-3}$ | 12.4 |
| 1-25 | 1.74 | 0.27 | $4.28\times10^{-2}$ | 70 |
| 1-26 | 1.74 | 0.31 | $1.74\times10^{-4}$ | 12.9 |
| 1-27 | 1.74 | 0.29 | $1.65\times10^{-2}$ | 28.6 |
| 1-28 | 1.74 | 0.30 | $1.85\times10^{-3}$ | 14.2 |

Control Experiments

Control experiments were carried out which involved (1) extrusion of POM with an antioxidant, (2) extrusion of POM with no additives, and (3) extrusion of POM containing an antioxidant and a superpolyamide-type stabilizer (a terpolymer of 66/610/6 nylon). The results of these experiments are shown in Table 3. As indicated in this Table, POM is unstabilized or contains only antioxidant has, on the average, an SI of 30. POM with 0.5 to 1.0% of the nylon terpolymer as stailizer has an SI of about 10.

was used to determine $\overline{M}_n$. The analysis and the calculation are well established: $\overline{M}_n = 2 \times 10^6$/sum of ends in units of equivalents per $10^6$ grams. The products so obtained are not capped and have roughly equal concentrations of amine and acid ends. Table 4 lists the ingredients from which the materials of these Examples were made. End group data are in Table 5.

The materials made as above were compounded into POM with antioxidant in the same manner as described in formation of the polyoxymethylene blend for Examples 1—1 to 1—28 and the control experiments in Table 3 still apply. Results are given in Table 5. Again, no

Table 3

| Controls | Active ends (equiv./$10^6$g) NH$_2$ | COOH | $\overline{M}_n$ | No. Amides per molecule | Wt% | Conc'n in POM Blend (equiv./100eq.CH$_2$O) Amide | Active end | Stability Index |
|---|---|---|---|---|---|---|---|---|
| Controls and Notes for Examples | | | | | | | | |
| 1. Blend (contains antioxidant) | | | | | | | | 24.2–35.8 (ave. of 4=29.5) |
| 2. POM only (no antioxidant) | | | | | | | | 15.8–38.0 (ave. of 5=30.0) |
| 3. Blend (66/610/6 nylon + antioxidant) | <40 | <40 | ca. 25,000 | ca. 200 | 1.0 | ca.0.25 | <1.2×10$^{-3}$ | 6.2–11.1 (ave. of 6=8.8) |
| " | " | " | " | " | 0.4–0.6 | ca.0.13 | <6×10$^{-4}$ | 8.3–14.6 (ave. of 6=10.6) |

Notes
(a) All blends contain 0.125 wt% of 2,2'-methylene-bis-(6-tertiary-butyl-4-methylphenol) as antioxidant.
(b) Active end = either amine or acid whichever is present in higher concentration.
(c) Stability Index = volume of gas (at room temperature) evolved per gram of blend between the 5th and 30th minute of heating at 259°C. in nitrogen A 0.5g charge in a 50-cc syringe was used.

Analysis

Examination of the data in Table 2 reveals that the monocapped oligomers are generally ineffective or destabilizing unless the molecular weight is high. The controlling factor is the avoidance of an excessive concentration of active amine or acid end groups. This fact is made particularly evident in FIG. 1 by plotting SI versus the concentration of active end. The concentration of active end is the equivalents of amine or acid, whichever is higher, per 100 equivalents of —CH$_2$O—units. The SI shows the beginning of a rapid increase with increasing concentration of active end at about $7 \times 10^{-3}$. The value of capping is demonstrated dramatically by comparison of monocapped oligomers and their acetylated derivatives. Thus, Example 1-1 indicates destabilization by the added monocapped, high amine-end oligomer, but excellent stabilization was accomplished with the fully capped derivative used in Example 1-2. There are eleven such comparisons in Table 2, and all show the same effect with the sole exception of Examples 1-15 and 1-16 where the molecular weight is the highest.

EXAMPLES 2–1 to 2–25

Linear oligomers and low molecular weight polymers of caprolactam were prepared using the general procedure described for Examples 1—1 to 1–28. Water was added instead of monofunctional amine or acid to promote reaction and control molecular weight. Loss of water occurred during reaction and end groups analysis stabilization occurs unless the concentration of active ends is low. It is significant that loss of stabilization occurs because of the increase in active ends even when the content of amide stabilizer in POM is increased. Examples 2-10 through 2-13, 2-16 and 2-17, and 2-22 through 2-25 show this. The effect is again made most clear by plotting SI versus active ends as is done in FIG. 2. For the uncapped materials in POM at the same, low level of amide stabilizer (1.0 wt % = 0.24–0.27 equivalents of amide per 100 equivalents of —CH$_2$O—), the SI begins to increase rapidly at about 7 × 10$^{-3}$ or at the same concentration as was observed with the monocapped oligomers with Examples 1—1 to 1-28. For the capped and uncapped materials in POM at the 5 wt. % level (1.32–1.38 equivalents of amide per 100 equivalents of —CH$_2$O—), a similar effect is to be seen.

Table 4

| Example | Caprolactam/Water Mole Ratio |
|---|---|
| 2-1 | 1/2.8 |
| 2-2 | 1/2.0 |
| 2-3 | 1/2.1 |
| 2-4 | 1/1 |
| 2-5, 2-6, 2-7 | 2/1 |
| 2-8, 2-9 | 4.4/1 |
| 2-10, 2-11, 2-12, 2-13 | 5/1 |
| 2-14, 2-15 | 3/1 |
| 2-16, 2-17 | 20/1 |
| 2-18, 2-19 | Same as Example 1-7; see Table 1 |
| 2-20, 2-21 | Same as Example 1-9; see Table 1 |
| 2-22, 2-23, 2-24, 2-25 | Same as Example 1-24; see Example 1 |

Table 5

| Example | Type Amide | Capping Groups A | B | Active Ends (equiv./$10^6$g) $NH_2$ | COOH | $\overline{M}_n$ | No. Amides per molecule |
|---|---|---|---|---|---|---|---|
| 2-1 | A$+$NH(CH$_2$)$_5$CO$+_n$B | H-(uncapped) | HO— | 858 | 805 | 1200 | 9.4 |
| 2-2 | " | " | " | 634 | 660 | 1550 | 12.5 |
| 2-3 | " | " | " | 525 | 478 | 1990 | 16.4 |
| 2-4 | " | " | " | 366 | 373 | 2710 | 22.8 |
| 2-5 | " | " | " | 164,239 | 237 | 4570 | 39.3 |
| 2-6 | " | " | " | " | " | " | " |
| 2-7 | " | " | " | " | " | " | " |
| 2-8 | " | " | " | 202 | 176 | 5290 | 45.6 |
| 2-9 | " | " | " | " | " | " | " |
| 2-10 | " | " | " | 140 | 148 | 6950 | 59.3 |
| 2-11 | " | " | " | " | " | " | " |
| 2-12 | " | " | " | " | " | " | " |
| 2-13 | " | " | " | " | " | " | " |
| 2-14 | " | " | " | 183 | 57.0 | 8330 | 72.5 |
| 2-15 | " | " | " | " | " | " | " |
| 2-16 | " | " | " | 83.5 | 80.0 | 12,200 | 107 |
| 2-17 | " | " | " | " | " | " | " |
| 2-18 | " | CH$_3$CO— | n-C$_6$H$_{13}$NH— | 13.0 | 7.5 | 1790 | 15.5 |
| 2-19 | " | " | " | " | " | " | " |
| 2-20 | " | " | " | 42.8 | low | 2500 | 21.9 |
| 2-21 | " | " | " | " | " | " | " |
| 2-22 | A$+$NH(CH$_2$)$_5$CO$+_n$NH(CH$_2$)$_6$NH$+$CO(CH$_2$)$_5$NH$+_n$A | A=CH$_3$CO— | | 17.5 | 130 | 2700 | 22.5 |
| 2-23 | " | " | | " | " | " | " |
| 2-24 | " | " | | " | " | " | " |
| 2-25 | " | " | | " | " | " | " |

| Example | Wt.% | Amide | Conc'n. in POM Blend (equiv./100 eq.CH$_2$O) Active end | Stability Index |
|---|---|---|---|---|
| 2-1 | 1.0 | 0.24 | 2.60×10$^{-2}$ | 37.8 |
| 2-2 | 1.0 | 0.24 | 2.00×10$^{-2}$ | 35.4 |
| 2-3 | 1.0 | 0.25 | 1.59×10$^{-2}$ | 22.3 |
| 2-4 | 1.0 | 0.25 | 1.13×10$^{-2}$ | 23.6 |
| 2-5 | 1.0 | 0.26 | 7.18×10$^{-3}$ | 32.2,16.4 |
| 2-6 | 2.0 | 0.53 | 1.45×10$^{-2}$ | 21.6 |
| 2-7 | 3.0 | 0.80 | 2.20×10$^{-2}$ | 33.4 |
| 2-8 | 1.0 | 0.26 | 6.12×10$^{-3}$ | 10.8 |
| 2-9 | 2.0 | 0.53 | 1.24×10$^{-2}$ | 11.0 |
| 2-10 | 1.0 | 0.26 | 4.48×10$^{-3}$ | 12.3 |
| 2-11 | 2.0 | 0.52 | 9.06×10$^{-3}$ | 15.8 |
| 2-12 | 3.0 | 0.79 | 1.37×10$^{-2}$ | 23.2 |
| 2-13 | 5.0 | 1.34 | 2.34×10$^{-2}$ | 25.4 |
| 2-14 | 1.0 | 0.26 | 5.54×10$^{-3}$ | 13.0 |
| 2-15 | 2.0 | 0.53 | 1.12×10$^{-2}$ | 11.8 |
| 2-16 | 1.0 | 0.27 | 2.53×10$^{-3}$ | 10.9 |
| 2-17 | 5.0 | 1.38 | 1.32×10$^{-2}$ | 16.3 |
| 2-18 | 1.0 | 0.26 | 3.94×10$^{-1}$ | 9.7 |
| 2-19 | 5.0 | 1.37 | 2.05×10$^{-3}$ | 10.9,8.1 |
| 2-20 | 1.0 | 0.27 | 1.30×10$^{-3}$ | 8.3 |
| 2-21 | 5.0 | 1.38 | 6.76×10$^{-3}$ | 11.6,10.3 |
| 2-22 | 1.0 | 0.25 | 3.94×10$^{-3}$ | 12.4 |
| 2-23 | 2.0 | 0.51 | 7.96×10$^{-3}$ | 14.5 |
| 2-24 | 3.0 | 0.77 | 1.21×10$^{-2}$ | 18.2 |
| 2-25 | 5.0 | 1.32 | 2.05×10$^{-2}$ | 26.4 |

EXAMPLES 3–1 to 3–17

These Examples establish that a minimum molecular weight must be exceeded for an amide oligomer to function as a stabilizer in POM. The ingredients for the oligomers are given in Table 6. All of the oligomers not previously described were made via the shaker tube technqiue described for Examples 1—1 to 1–28. As shown, for some of these materials a monoamine and monobasic acid were both charged to the tube so that a dicapped product was obtained directly. End group data are given in Table 7. The oligomer used in Examples 3—1 through 3–5 was obtained by heating on a steam bath and stirring a solution of 35 g of the shaker tube product in 70 ml glacial acetic acid and 21 ml acetic anhydride. Volatiles were removed by heating on a steam bath while rotating under reduced pressure. The residue was recrystallized from methanol. Washing with ether and drying yielded a product in which no measurable concentration of amine could be found. Because the yield was only 38 percent and fractionation was possible in the recrystallization step, the molecular weight was checked by vapor pressure osmometry and found to be 514.

POM blends were made as described with the disclosure of Examples 1—1 to 1–28, and results are given in Table 7. The oligomer with an $\overline{M}_n$ of 514 is not an effective stabilizer. At a molecular weight of 900, however, good stabilization is observed. The appearance of the melts suggest that effective stabilization is achieved when the oligomer is insoluble, and a minimum molecular weight must be exceeded to assure adequate insolubility.

Table 6

| Example | Ingredients | Mole Ratio |
|---|---|---|
| 3-1, 3-2, 3-3, 3-4, 3-5 | Caprolactam<br>n-Hexylamine | 1<br>1.2 |
| 3-6, 3-7, 3-8, 3-9, 3-10 | Same as Exs. 1-2, 1-3 | See Table 1 |
| 3-11, 3-12, 3-13 | Caprolactam<br>n-Hexylamine<br>Acetic Acid | 6.77<br>1<br>1 |
| 3-14 | Same as Exs. 1-11, 1-12 | See Table 1 |
| 3-15 | Caprolactam<br>n-Hexylamine<br>Acetic Acid | 6.67<br>1<br>1 |
| 3-16, 3-17 | Laurolactam<br>Hexamethylenediamine | 2<br>1 |

Table 7

| Example | Type Amide | Capping Groups A | B | Active Ends (equiv./10⁶g) NH₂ | COOH | $\overline{M}_n$ | No. Amides per molecule |
|---|---|---|---|---|---|---|---|
| 3-1 | A⎡NH(CH₂)₅CO⎤ₙB | CH₃CO— | n-C₆H₁₃NH— | low | low | 514 | 4.3 |
| 3-2 | " | " | " | " | " | " | " |
| 3-3 | " | " | " | " | " | " | " |
| 3-4 | " | " | " | " | " | " | " |
| 3-5 | " | " | " | " | " | " | " |
| 3-6 | " | " | " | 63.6 | low | 900 | 7.7 |
| 3-7 | " | " | " | " | " | " | " |
| 3-8 | " | " | " | " | " | " | " |
| 3-9 | " | " | " | " | " | " | " |
| 3-10 | " | " | " | " | " | " | " |
| 3-11 | " | " | " | 65.8 | 87.4 | 850 | 7.3 |
| 3-12 | " | " | " | " | " | " | " |
| 3-13 | " | " | " | " | " | " | " |
| 3-14 | " | " | " | 25.2 | 7.1 | 3490 | 30.6 |
| 3-15 | " | " | " | 93.0 | 122 | 830 | 7.1 |
| 3-16 | A—NH(CH₂)₆NH—A | A=C₁₁H₂₃CO— | | 3.7 | 1.0 | 479 | 2.0 |
| 3-17 | " | " | | " | " | " | " |

| Example | Wt.% | Conc'n. in POM Blend (equiv./100eq.CH₂O) Amide | Active end | Stability Index | |
|---|---|---|---|---|---|
| 3-1 | 0.05 | 0.013 | <1.0×10⁻³ | 17.1 | ⎫ |
| 3-2 | 0.10 | 0.025 | " | 44.7 | ⎬ clear melt |
| 3-3 | 0.20 | 0.05 | " | 18.7 | ⎭ |
| 3-4 | 0.30 | 0.075 | " | 15.2 | |
| 3-5 | 1.00 | 0.25 | " | 29.7, 26.1 | slightly cloudy melt |
| 3-6 | 0.05 | 0.013 | 1.0×10⁻⁴ | 16.6 | slightly |
| 3-7 | 0.10 | 0.026 | 1.9×10⁻⁴ | 14.8, 14.0 | cloudy |
| 3-8 | 0.20 | 0.052 | 3.8×10⁻⁴ | 10.9 | melt |
| 3-9 | 0.30 | 0.078 | 5.7×10⁻⁴ | 10.7 | cloudy |
| 3-10 | 1.00 | 0.26 | 1.93×10⁻³ | 10.8, 8.9 | melt |
| 3-11 | 0.10 | 0.026 | 2.6×10⁻⁴ | 23.2 | very slightly cloud melt |
| 3-12 | 0.50 | 0.13 | 1.32×10⁻³ | 11.6 | slightly cloudy melt |
| 3-13 | 1.00 | 0.26 | 2.64×10⁻³ | 7.9 | cloudy melt |
| 3-14 | 1.00 | 0.27 | 7.6×10⁻⁴ | 7.9 | cloudy melt |
| 3-15 | 1.00 | 0.26 | 3.70×10⁻³ | 16.6 | cloudy melt |
| 3-16 | 1.00 | 0.13 | 1.1×10⁻⁴ | 29.3 | ⎫ clear melt |
| 3-17 | 2.00 | 0.26 | 2.3×10⁻⁴ | 29.4 | ⎭ |

EXAMPLES 4–1 to 4–22

These Examples show that capping and not the nature of the capping group is the essential factor in achieving stabilization of POM. The ingredients for the oligomers used in this example are shown in Table 8, and the end group analyses are given in Table 9. The shaker tube technique of the previous examples was used to make all of the oligomers except those for Ex. 4–18 and 4–22. The olgiomer for Example 4–18 was made in a stirred autoclave in the same manner described previously for Ex. 1–24. In Example 4–22, diethyl adipate plus hexamethylene diamine in mole ratio of 1.10/1.0 were reacted in an unstirred autoclave with removal of ethyl alcohol instead of water (otherwise the same procedure as will be described for subsequent Examples 5–1 to 5–24). The product was purified by solution in hexafluoroisopropanol, precipitation with methanol, washing and drying. Dicapped products were obtained directly except for Ex. 4–8 and 4–9. The acetylation technique within the disclosure of Examples 1—1 to 1–20 was used with minor modification in the amounts of solvent and acetic anhydride to convert the monocapped, amine-terminated oligomers into their dicapped derivatives.

Blends with POM were prepared in the same way as noted in the previous Examples. Stability data are given in Table 9 and shown that alkyl, cycloalkyl, aryl, alkaryl, and aralkyl groups may be present on either end of the molecule. Examples 4–1 through 4–17 invole different kinds of capping groups on the ends of the oligomeric molecule. Examples 4–18 through 4–21 show that the capping group may be of the same kind on both ends of the molecule. Examples 4–19, 4–20 and 4–22 show that the capping group need not be an amide.

Table 8

| Example | Ingredients | Mole Ratio |
|---|---|---|
| 4-1 | Same as Ex. 1-18; See Table 1 | |
| 4-2 | Same as Ex. 1-7; See Table 1 | |
| 4-3 | Same as Ex. 1-16; See Table 1 | |
| 4-4, 4-5 | Caprolactam, dodecylamine, acetic acid | 15/1/1 |
| 4-6 | Same as Ex. 1-20 Caprolactam, dodecylamine, acetic acid | |
| 4-7 | Caprolactam, cyclohexylamine, acetic acid | 15/1/1 |
| 4-8 | Caprolactam, aniline | 30/1 |
| 4-9 | Caprolactam, para-n-butylaniline | 15/1 |
| 4-10 | Caprolactam, beta-phenylethylamine, acetic acid | 15/1/1 |
| 4-11 | Caprolactam, n-hexylamine, dodecanoic acid | 15/1/1 |
| 4-12 | Caprolactam, n-hexylamine, octadecanoic acid | 15/1/1 |
| 4-13 | Caprolactam, n-hexylamine, cyclohexane-carboxylic acid | 15/1/1 |
| 4-14 | | |
| 4-15 | Caprolactam, n-hexylamine, ethyl benzoate | 15/1/1 |
| 4-16 | Caprolactam, n-hexylamine, para-t-butyl- | |

Table 8-continued

| Example | Ingredients | Mole Ratio |
|---|---|---|
| 4-17 | benzoic acid | 15/1/1 |
| | Caprolactam, n-hexylamine, phenylacetic acid | 15/1/1 |
| 4-18 | Caprolactam, hexamethylenediamine, acetic acid | 23.8/1/2.2 |
| 4-19 | Caprolactam, hexamethylenediamine, | 7.5/1/2 |

Table 8-continued

| Example | Ingredients | Mole Ratio |
|---|---|---|
| 4-20 | phthalic anhydride | |
| 4-21 | Caprolactam, n-hexylamine, dodecanedioic acid | 15/1/1 |
| 4-22 | Diethyl adipate, hexamethylenediamine | 1.1/1 |

Table 9

| Example | Type Amide | Capping Groups A | Capping Groups B | Active Ends (equiv/$10^6$g) $NH_2$ | Active Ends (equiv/$10^6$g) COOH | $\overline{M}_n$ | No. Amides per molecule |
|---|---|---|---|---|---|---|---|
| 4-1 | $A\!-\!\!\!\!+\!NH(CH_2)_5CO\!-\!\!\!\!+_n B$ | $CH_3CO-$ | $n\text{-}C_4H_9NH-$ | 8.5 | low | 850 | 7.5 |
| 4-2 | " | " | $n\text{-}C_6H_{13}NH-$ | 13.0 | 7.5 | 1790 | 15.6 |
| 4-3 | " | " | $n\text{-}C_8H_{17}NH-$ | 22.6 | 35.0 | 6750 | 59.2 |
| 4-4 | " | " | $n\text{-}C_{12}H_{25}NH-$ | 81.0 | 85.0 | 1650 | 13.6 |
| 4-5 | " | " | " | " | " | " | " |
| 4-6 | " | " | $n\text{-}C_{18}H_{37}NH-$ | 12.4 | low | 970 | 7.3 |
| 4-7 | " | " | ⬡—NH— | 65.0 | 69.0 | 1800 | 15.7 |
| 4-8 | " | " | ⬡—NH— | 36.1 | 42.1 | 2490 | 21.8 |
| 4-9 | " | " | $n\text{-}C_4H_9$—⬡—NH— | 19.6 | 45.4 | 1660 | 14.0 |
| 4-10 | " | " | ⬡—$CH_2CH_2NH-$ | 68.3 | 68.3 | 2040 | 17.6 |
| 4-11 | " | $C_{11}H_{23}CO-$ | $n\text{-}C_6H_{13}NH-$ | 86.2 | 77.1 | 1700 | 13.5 |
| 4-12 | " | $C_{17}H_{35}CO-$ | " | 81.5 | 89.3 | 1750 | 13.5 |
| 4-13 | " | ⬡—CO— | " | 67.1 | 69.6 | 1710 | 14.9 |
| 4-14 | " | " | " | " | " | " | " |
| 4-15 | " | ⬡—CO— | " | 106 | 129 | 1490 | 13.0 |
| 4-16 | " | $(CH_3)_3C$—⬡—CO— | " | 67.4 | 78.6 | 1780 | 14.4 |
| 4-17 | " | ⬡—$CH_2CO-$ | " | 96.8 | 97.0 | 1720 | 13.4 |
| 4-18 | $A\!-\!\!+\!NH(CH_2)_5CO\!-\!\!+_n NH(CH_2)_6NH\!-\!\!+\!CO(CH_2)_5NH\!-\!\!+_n A$ | $A=CH_3CO-$ | | 42.4 | 63.3 | 2440 | 22.0 |
| 4-19 | " | $A=$ ⬡(CO–)(CO–) | | 54.8 | 97.2 | 1800 | 12.9 |
| 4-20 | " | " | | " | " | " | " |
| 4-21 | $B\!-\!\!+\!CO(CH_2)_5NH\!-\!\!+\!CO(CH_2)_{10}CO\!-\!\!+\!NH(CH_2)_5CO\!-\!\!+_n B$ | | $B=n\text{-}C_6H_{13}NH-$ | 94.1 | 116 | 1750 | 14.0 |
| 4-22 | $B-CO(CH_2)_4CO\!-\!\!+\!NH(CH_2)_6NHCO(CH_2)_4CO\!-\!\!+_n B$ | | $B=C_2H_5O-$ | 61.7 | 62.5 | 2350 | 19.5 |

| Example | Wt. % | Conc. in POM Blend (equiv./100 eq. $CH_2O$) Amide | Conc. in POM Blend (equiv./100 eq. $CH_2O$) Active End | Stability Index |
|---|---|---|---|---|
| 4-1 | 1.0 | 0.27 | $2.6 \times 10^{-4}$ | 11.9 |
| 4-2 | 1.0 | 0.26 | $3.9 \times 10^{-4}$ | 9.7 |
| 4-3 | 1.0 | 0.27 | $1.06 \times 10^{-3}$ | 11.7 |
| 4-4 | 1.0 | 0.25 | $2.57 \times 10^{-3}$ | 20.8, 11.5 |
| 4-5 | 0.5 | 0.13 | $1.28 \times 10^{-3}$ | 12.7 |
| 4-6 | 1.0 | 0.23 | $3.8 \times 10^{-4}$ | 12.4 |
| 4-7 | 1.0 | 0.26 | $2.09 \times 10^{-3}$ | 9.1 |
| 4-8 | 1.0 | 0.27 | $1.28 \times 10^{-3}$ | 8.4 |
| 4-9 | 1.0 | 0.26 | $1.38 \times 10^{-3}$ | 6.8 |
| 4-10 | 1.0 | 0.26 | $2.07 \times 10^{-3}$ | 7.0 |
| 4-11 | 1.0 | 0.24 | $2.61 \times 10^{-3}$ | 13.1 |
| 4-12 | 1.0 | 0.23 | $2.70 \times 10^{-3}$ | 10.6 |
| 4-13 | 1.0 | 0.26 | $2.11 \times 10^{-3}$ | 17.6, 7.3 |
| 4-14 | 0.5 | 0.13 | $1.05 \times 10^{-3}$ | 9.4 |
| 4-15 | 1.0 | 0.26 | $3.91 \times 10^{-3}$ | 11.5 |
| 4-16 | 1.0 | 0.25 | $2.38 \times 10^{-3}$ | 8.6 |

Table 9-continued

| | | | | | |
|---|---|---|---|---|---|
| 4-17 | | | 1.0 | 0.24 | $2.94 \times 10^{-3}$ 7.6 |
| 4-18 | | | 1.0 | 0.27 | $1.92 \times 10^{-3}$ 6.7 |
| 4-19 | | | 1.0 | 0.22 | $2.94 \times 10^{-3}$ 27.9,8.1 |
| 4-20 | | | 0.5 | 0.11 | $1.47 \times 10^{-3}$ 10.3 |
| 4-21 | | | 1.0 | 0.24 | $3.51 \times 10^{-3}$ 13.1 |
| 4-22 | | | 1.0 | 0.25 | $1.89 \times 10^{-3}$ 14.1 |

EXAMPLES 5-1 to 5-24

The earlier examples have, for reason of convenience, made use mostly of capped, linear oligomers of caprolactam, but other amide oligomers can be used as is now shown. The ingredients for the oligomer preparations for this example are given in Table 10. The oligomers of Examples 5-2 to 5—5 and 5-20 to 5-22 were made in an autoclave with water initially present but subsequently removed as described for Example 1-24. The oligomer for Example 5-2 was made in precisely the same way as Example 1-24. The oligomers for Examples 5-3 to 5—5 and 5-20 to 5-22 were made in a vessel not equipped with a stirrer or provision for drainage of the product. After reaching atmospheric pressure and 275°C., the batch was held at 275°C. for one hour (under nitrogen for 5-3 to 5—5 and under vacuum for 5-20 to 5-22) before cooling to room temperature. The top of the vessel, which was attached to the clove body by a bolted flange, was taken off to permit removal of the solidified product. The products thus obtained were extracted with water and dried prior to use.

For the oligomers of Examples 5-23 and 5-24, the ingredients were charged to a glass resins kettle together with 0.06 wt. percent of an antifoaming agent (Dow Corning Antifoam A) and heated to 225°C. at atmospheric pressure to drive off water. The temperature was raised to 260°C. and maintained at this temperature for 1.5 hours after the rate of water removal became negligibly small. A nitrogen blend was maintained throughout the reaction. Cooling to room temperature yielded the solidified product which was removed from the kettle and fragmented. The dimer acid used is the commercially available (Humko or Emery) 36-carbon condensation product of 18-carbon unsaturated fatty acids.

Compound with POM was accomplished in the same manner as described in relationship to the disclosure within Examples 1—1 to 1-28 and the results are shown in Tables 11 and 12. A dicapped 12-oligomer, 612-oligomer, 6I-oligomer (I = isophthalic acid), a 66/6 (65/35) co-oligomer, and a 612/6 (85/15) co-oligomer are all seen to function as stabilizers (Table 11). However, oligomers that involve dimer acid as a major component are not stabilizers (Table 12). A number of commerical materials identified as polyamides based on dimer acid and ethylene diamine were also evaluated and also proved to be ineffective (Table 12).

Table 10

| Example | Ingredients | Mole Ratio |
|---|---|---|
| 5-1 | Laurolactam, n-hexylamine, water; acetylated in a second step. Same as Example 1-28; see Table 1 | 16.7/1/1 |
| 5-2 | Hexamethylenediamine, dodecanedioic acid, acetic acid | 12.7/11.5/2 |
| 5-3 | Hexamethylenediamine, isophthalic acid, benzoic acid | 8/7/2 |
| 5-4 | Hexamethylenediamine, adipic acid, caprolactam, acetic acid | 13.1/12.1/13.6/2 |
| 5-5 | Hexamethylenediamine, dodecanedioic acid, caprolactam, acetic acid | 8.65/7.65/3.7/2 |
| 5-20, 5-21 | Hexamethylenediamine, dimer acid, acetic acid | 11/10/2 |
| 5-22 | Same as for 5-20, 5-21 | 2/1/2 |
| 5-23, 5-24 | Hexamethylenediamine, dimer acid | 1/1 |

Table 11

| Example | Type Amide | Capping Groups A | Capping Groups B | Active Ends (equiv./10⁶g) NH₂ | Active Ends (equiv./10⁶g) COOH | $\overline{M}_n$ | No. Amide per molecule | Conc'n in POM Blend (equiv. /100 eq.CH₂O) Wt% | Conc'n in POM Blend A-mide | Conc'n in POM Blend Active end | Stability Index |
|---|---|---|---|---|---|---|---|---|---|---|---|
| 5-1 | A⁺NH(CH₂)₁₁CO⁺ₙB | CH₃CO— | n-C₆H₁₃NH— | 4.9 | 31.8 | 3570 | 18.4 | 1.65 | 0.23 | $1.60 \times 10^{-3}$ | 14.2 |
| 5-2 | A⁺NH(CH₂)₆NHCO(CH₂)₁₀CO⁺ₙNH(CH₂)₆NH—A | A=CH₃CO— | | 44.1 | 59.3 | 3080 | 20.5 | 1.0 | 0.20 | $1.80 \times 10^{-3}$ | 9.4 |
| 5-3 | A⁺NH(CH₂)₆NHCO ⌬ CO⁺ₙNH(CH₂)₆NH—A | A= ⌬-CO— | | 45.6 | 200 | 1635 | 12.7 | 0.75 | 0.18 | $4.54 \times 10^{-3}$ | 13.7 |
| 5-4 | A⁺NH(CH₂)₆NH—R₁—R₂⁺ₙNH(CH₂)₆NH—A  R₁ —CO(CH₂)₄CO— R₁ or —CO(CH₂)₅NH— or —NH(CH₂)₅CO— or —NH(CH₂)₆NH—R₁— | A=CH₃CO— | 66/6 co-oligomer, 65/35 wt ratio | 62.5 | 73.4 | 3460 | 30.9 | 0.75 | 0.20 | $1.67 \times 10^{-3}$ | 7.4 |

Table 11-continued

| Example | Type Amide | Capping Groups A | Capping Groups B | Active Ends (equiv./10⁶g) NH₂ | Active Ends (equiv./10⁶g) COOH | $\bar{M}_n$ | No. Amide per molecule | Conc'n in POM Blend (equiv./100 eq.CH₂O) Wt% | Conc'n in POM Blend A-mide | Conc'n in POM Blend Active end | Stability Index |
|---|---|---|---|---|---|---|---|---|---|---|---|
| 5-5 | —CO(CH₂)₁₀CO— or —CO(CH₂)₅NH— | R₁ or —NH(CH₂)₅CO— or —NH(CH₂)₆NH—R₁— | 612/6 co-oligomer, 85/15 wt ratio | 62.5 | 60.9 | 2520 | 17.8 | 0.93 | 0.20 | 1.76 ×10⁻³ | 10.2 |

Table 12

| Example | Type Amide | Capping Groups A | Capping Groups B | Active Ends (equiv./10⁶g) NH₂ | Active Ends (equiv./10⁶g) COOH | $\bar{M}_n$ | No. Amides per molecule |
|---|---|---|---|---|---|---|---|
| 5-6 | "Emerez" 1532 | Assume CH₂/CONH = 18/1 so that molecular weight per CONH = 295 | | | | | |
| 5-7 | " 1537 | " | | 178 | 1424 | 1250⁽¹⁾ | |
| 5-8 | " 1551 | " | | | | | |
| 5-9 | "Versamid" 335 | " | | | | | |
| 5-10 | " 750 | " | | | | | |
| 5-11 | " 758 | " | | | | | |
| 5-12 | " 810 | " | | | | | |
| 5-13 | " 871 | " | | 31.8 | 85.0 | ca. 4100 | |
| 5-14 | " 930 | " | | " | " | " | |
| 5-15 | " " | " | | 45.8 | 58.6 | ca. 3000 | |
| 5-16 | " 940 | " | | " | " | " | |
| 5-17 | " " | " | | 31.5 | 69.1 | — | |
| 5-18 | " 950 | " | | " | " | — | |
| 5-19 | " " | " | | | | | |
| 5-20 | A⁺NH(CH₂)₆NHCO—D—CO⁺ₙNH(CH₂)₆NH—A | A=CH₃CO— | | 12.7 | 117 | 4480 | 14.4 |
| 5-21 | " | " | | " | " | " | " |
| 5-22 | D = "Dimer acid" | " | | 8.10 | 13.8 | 815 | 3.9 |
| 5-23 | A⁺NH(CH₂)₆NHCO—D—CO⁺ₙB | Not intentionally capped, but has low melt and low solution viscosity. | | 19.8 | 72.2 | 3800⁽²⁾ | — |
| 5-24 | (mol.wt.per CONH=302) | | | " | " | " | — |

| Example | Wt% | Conc'n in POM Blend (equiv./100eq.CH₂O) Amide | Conc'n in POM Blend Active end | Stability Index |
|---|---|---|---|---|
| 5-6 | 1.0 | 0.10 | | 55 |
| 5-7 | 1.0 | 0.10 | | 35 |
| 5-8 | 1.0 | 0.10 | 4.3×10⁻² | 57 |
| 5-9 | 1.0 | 0.10 | | 35 |
| 5-10 | 1.0 | 0.10 | | 16 |
| 5-11 | 1.0 | 0.10 | | 24 |
| 5-12 | 1.0 | 0.10 | | 30 |
| 5-13 | 1.0 | 0.10 | | 57 |
| 5-14 | 1.0 | 0.10 | 2.58×10⁻³ | 33 |
| 5-15 | 2.0 | 0.21 | 5.20×10⁻³ | 51 |
| 5-16 | 1.0 | 0.10 | 1.78×10⁻³ | 52 |
| 5-17 | 2.0 | 0.21 | 3.59×10⁻³ | >75 |
| 5-18 | 1.0 | 0.10 | 2.10×10⁻³ | 36 |
| 5-19 | 2.0 | 0.21 | 4.23×10⁻³ | >75 |
| 5-20 | 1.0 | 0.10 | 3.55×10⁻³ | 61 |
| 5-21 | 2.53 | 0.25 | 9.10×10⁻³ | >50 |
| 5-22 | 1.48 | 0.22 | 3.64×10⁻³ | 55 |
| 5-23 | 1.0 | 0.10 | 2.19×10⁻³ | 14.9 |
| 5-24 | 2.0 | 0.20 | 4.41×10⁻³ | 29.1 |

⁽¹⁾Assumes no capped ends. Active ends based on manufacturer's reported amine and acid values.
⁽²⁾Estimated from inherent viscosity in m-cresol (0.5g/100ml, 25.0°C).

EXAMPLE 6

A commerical oxymethylene copolymer, Celcon M90-04, was extracted first with methanol and then with chloroform using a Soxhlet extraction device. Infrared analysis before and after extraction indicated removal of most of the additives. After drying, 200 parts of the extracted copolymer were dry blended with 0.25 part of 2,2'-methylenebis(6-tertiary-butyl-4-methylphenol) and 1.90 parts of a linear oligomer made from caprolactam. The oligomer had a molecular weight of 1640, was capped by means of reaction involving n-hexyl amine and acetic acid, and had amine and acid end group concentrations of 39.7 and 75.9 equivalents per million grams. This means that approximately 90% of the ends were capped. The blend was melt compounded as described in Example 1. Another composition was similarly prepared from 200 parts of the extracted copolymer and 0.25 part of the antioxidant but without the 6-oligomer. Both compositions were tested for thermal stability by heating 0.5 g. at 259°C. in nitrogen in a 50-cc syringe and observing the displacement of the plunger. After 20 and 80 minutes of heating, the sample without the oligomer caused a displacement of 0.94 and 1.94 cm and the sample with oligomer, of 0.66 and 0.92 cm. Stabilization by oligomer is clearly indicated.

EXAMPLES 7-1 to 7-29

The oligomers or low molecular weight polymers used in this example and not previously described were made either in a stirred, drainable autoclave as for Example 1-24 (Examples 7-10, 7-21, and 7-23 to 7-29) or in an unstirred, nondrainable vessel as discussed in Example 5 (Examples 7-6 to 7-9, 7-12 to 7-14, 7-16, 7-17 and 7-22). Similar products could be obtained by either technique; convenience dictated the choice of preparative technique. Ingredients and mole ratios are given in Table 13, and the $\overline{M}_n$ of the products are provided in Table 14.

Compounding with POM having an $\overline{M}_n$ of either about 40,000 or 64,000 was accomplished in the manner outlined within the procedure of Examples 1-1 to 1-28. These blends were examined for their tendency to generate a mold deposit during injection molding or a die deposit during extrusion. The molding test made use of a 6-oz. or 7-oz. reciprocating screw injection molding machine with a two-cavity mold that involved a pinpoint gate perpendicular to the top surface of a hat-shaped part with a wall thickness of about 40 mils. The total shot weight was 29.5 g, and each part weighed 8.4 g. The melt temperature was 210°C.; the first stage pressure was 15,000 to 20,000 psi; the second stage pressure was 13,000 to 15,000 psi; the mold temperature was 60 to 85°C.; the overall cycle was 15 to 17 seconds; and a high injection rate was used. Deposit developed on the surface of the cavity around the gate. A corresponding surface depression occurred on the molded part and permitted recognition of deposit and growth of deposit without interrupting the molding cycle.

Examples 7-1 to 7-18 show that much mold deposit is generated when a superpolyamide is used as the thermal stabilizer, but little or none is observed when an amide oligomer is used in place of the superpolyamide. Other additives may be present without affecting the result as is illustrated by Examples 7-1 and 7-2.

The die deposit consisted of a dark brown material that developed on the die face around the extruding strand. Inspection for die deposit was made during extrusion compounding in a 2-inch single screw extruder (Condition A in Table 14) or in subsequent tests. In one test a tubing die mounted on a 2-inch single screw extruder was used (Condition B in Table 14); in the other, a one-hole, round beading die was used on a 1.25-inch single screw extruder (Condition C in Table 14). Lower melt temperatures (Condition A, 190°C. or Condition C, 199°C.) promoted deposit formation. The advantage accruing to the use of capped oligomers of adequately low molecular weight is clearly evident over a range of melt temperatures. Thus, under Condition A at 210°-220°C., deposit was observed at a molecular weight of 8,200 but not at 4,900 when used at the 0.75 to 0.93 wt. % level in POM with a $\overline{M}_n$ of about 40,000. At the 0.5-0.63% level in POM with a $\overline{M}_n$ of about 64,000, an upper limit for little or no deposit is an oligomer $\overline{M}_n$ of 5,600. Condition C (melt) = 199°C.) indicates the $\overline{M}_n$ for the oligomers should be below 5,500, but at 210°-220°C. the maximum $\overline{M}_n$ for the oligomer is at least 10,100 in the lower molecular weight POM and between 6,800 and 14,900 in the higher molecular weight POM.

Table 13

| Example | Ingredients | Mole Ratio |
|---|---|---|
| 7-2, 7-4 | Same as for Ex. 1-7; see Table 1 | |
| 7-5, 7-20 | Same as for Ex. 4-18; see Table 8 | |
| 7-6 | Caprolactam, n-hexylamine, acetic acid | 40/1/1 |
| 7-7 | " | 100/1/1 |
| 7-8 | " | 100/1/1 |
| 7-9 | " | 220/1/1 |
| 7-10 | Hexamethylenediamine, dodecanedioic acid, acetic acid | 6.7/5.55/2 |
| 7-11 | Same as for Ex. 5-2; see Table 10 | |
| 7-12, 7-22 | Hexamethylenediamine, dodecanedioic acid, caprolactam, acetic acid | 16.7/15.7/7.6/2 |
| 7-13 | Same as for Ex. 7-12 and 7-22 | 121/120/57.5/2 |
| 7-14 | Hexamethylenediamine, adipic acid, caprolactam, acetic acid | 7.2/6.2/6.7/2 |
| 7-15 | Same as for Ex. 5-4; see Table 10 | |
| 7-16 | Same as for Ex. 7-14 | 9.5/8.5/2.3/2 |
| 7-17 | Same as for Ex. 7-14 | 18.4/17.4/4.5/2 |
| 7-18 | Same as for Ex. 5-3; see Table 10 | |
| 7-21 | Same as for Exs. 7-12 and 7-22 | 10.6/9.5/4.6/2 |
| 7-23 | " | 20.8/19.6/9.5/2 |
| 7-24 | " | 29.2/28.2/13.7/2 |
| 7-25 | " | 258/257/124/2 |
| 7-26 | Same as for Ex. 7-14 | 7.5/6.5/8.8/2 |
| 7-27 | " | 14.3/13.2/17.8/2 |
| 7-28 | " | 21.9/20.9/28/2 |
| 7-29 | " | 31/30/40/2 |

Table 14

| Example | POM Approx. $\overline{M}_n$ | Stabilizer Type | $\overline{M}_n$ | Wt.% | Mold Deposit |
|---|---|---|---|---|---|
| 7-1 | 40,000 | 66/610/6 - nylon | 25,000 | 1.00 | Much |
| 7-2 | " | 6-oligomer | 1,800 | " | Little or none |

Table 14-continued

| | | | | | |
|---|---|---|---|---|---|
| 7-3 | " | 66/610/6 - nylon | 25,000 | 0.75 | Much |
| 7-4 | " | 6-oligomer | 1,800 | " | Little or none |
| 7-5 | " | " | 2,400 | " | " |
| 7-6 | " | " | 4,900 | " | " |
| 7-7 | " | " | 8,200 | " | " |
| 7-8 | " | " | 8,400 | " | " |
| 7-9 | " | 6-polymer | 11,100 | " | " |
| 7-10 | " | 612-oligomer | 3,200 | 0.97 | " |
| 7-11 | " | " | 5,500 | " | " |
| 7-12 | " | 612/6(85/15)cooligomer | 4,300 | 0.93 | " |
| 7-13 | " | "copolymer | 10,100 | " | " |
| 7-14 | " | 66/6(65/35)cooligomer | 2,100 | 0.75 | " |
| 7-15 | " | " | 3,500 | " | " |
| 7-16 | " | 66/6(85/15)cooligomer | 2,100 | " | " |
| 7-17 | " | " | 3,500 | " | " |
| 7-18 | " | 6I-oligomer | 1,600 | " | " |
| 7-19 | 64,000 | 66/610/6 nylon | 25,000 | 0.50 | |
| 7-20 | " | 6-oligomer | 2,400 | " | |
| 7-21 | " | 612/6(85/15)cooligomer | 2,900 | 0.63 | |
| 7-22 | " | 612/6(85/15) " | 4,300 | " | |
| 7-23 | " | 612/6(85/15) " | 5,100 | " | |
| 7-24 | " | 612/6(85/15) " | 6,800 | " | |
| 7-25 | " | 612/6(85/15) copolymer | 14,900 | " | |
| 7-26 | " | 66/6(60/40)cooligomer | 2,400 | 0.50 | |
| 7-27 | " | " | 4,100 | " | |
| 7-28 | " | " | 5,600 | " | |
| 7-29 | " | " | 7,100 | " | |

| | Die Deposit | | | | |
|---|---|---|---|---|---|
| Exam- | Condition A | | Condi- | Condition C | |
| ple | Melt=190°C. | Melt=210-20°C. | tion B | Melt=199°C. | Melt=210-20°C. |
| 7-1 | also contains 0.3% C-black | | | | |
| 7-2 | " | | | | |
| 7-3 | Yes | Appears in minutes becomes heavy | Yes | Yes | Yв |
| 7-4 | | None after 1 hr. | No | | |
| 7-5 | Yes | No | No | Ono | |
| 7-6 | | No | | | |
| 7-7 | | Slight | | Yes | Little or none |
| 7-8 | | | | | |
| 7-9 | | Moderate | | Yes | |
| 7-10 | | | | | |
| 7-11 | | | | Yes | " |
| 7-12 | | | | | " |
| 7-13 | | | | | " |
| 7-14 | | | | | |
| 7-15 | | | | | |
| 7-16 | | | | | |
| 7-17 | | | | | " |
| 7-18 | | | | | " |
| 7-19 | | Same | Yes | | Heavy |
| 7-20 | | Little or none | No | | Little or none |
| 7-21 | | " | | | Slight |
| 7-22 | | " | | | " |
| 7-23 | | " | | | " |
| 7-24 | | " | | | " |
| 7-25 | | | | | Moderate |
| 7-26 | | " | | | Some |
| 7-27 | | " | | | |
| 7-28 | | Slight | | | |
| 7-29 | | Some | | | |

Condition A — 2 in. single screw extruder, two 3/16 or 1/4 in. diameter holes
Conditon B — 2 in. single screw extruder, tubing die 0.200 × 0.257 in.
Condition C — 1.25 in. single screw extruder, one 0.10 in. diameter hole for blends based on 40,000 POM, 0.15 in. if 64,000 POM

EXAMPLE 8

An oxymethylene homopolymer with terminal alkyl groups (see U.S. Pat. No. 3,480,694, Column 2, lines 37 to 49) was compounded as in Example 1 with 1.0 weight percent of the nylon terpolymer or 1.0 weight percent of the same oligomer used in Example 7-21 (see Table 13) or with no stabilizer. The stability indices were, respectively, 5.8, 4.8, and 10.4. Stabilization by the capped oligomer is again shown.

Although the invention has been described by way of specific embodiments, it is not intended to be limited thereto. As will be apparent to those skilled in the art, numerous embodiments can be made without departing from the spirit of the invention or the scope of the following claims.

What is claimed is:
1. A composition of matter comprising
  A. 90% to 99.99% by weight of an oxymethylene homopolymer or copolymer comprised of at least 60% by weight of oxymethylene segments, and
  B. 10 to 0.01% by weight a dicapped amide oligomer having a molecular weight of between 800 to 10,000 wherein the active ends of said oligomer constitute no more than 0.02 mole percent of the formaldehyde segments in said homopolymer or copolymer.

2. The composition of claim 1 wherein said amide oligomer is present in an amount of 0.1 to 7% by weight.

3. The composition of claim 1 wherein said amide oligomer is present in an amount of 0.2 to 5% by weight.

4. The composition of claim 1 wherein said amide oligomer has a molecular weight no higher than 7,000.

5. The composition of claim 3 wherein said amide oligomer has a molecular weight no higher than 7,000.

6. The composition of claim 1 wherein the active ends of said amide oligomer are present in an amount no greater than 0.015 mole percent of said formaldehyde segments.

7. The composition of claim 1 wherein the active ends of said amide oligomer are present in an amount no greater than 0.01 mole percent of said formaldehyde segments.

8. The composition of claim 1 wherein said amide oligomer is linear.

9. The composition of claim 1 wherein said amide oligomer includes internal linkages derived from caprolactam or laurolactam.

10. The composition of claim 1 wherein said amide oligomer includes internal linkages derived from hexamethylene diamine and diethyl adipate; hexamethylene diamine and dodecanedioic acid; hexamethylene diamine and isophthalic acid; hexamethylene diamine, dodecanedioic acid and caprolactam; or hexamethylene diamine, adipic acid and caprolactam.

11. The composition of claim 1 wherein said oxymethylene is a homopolymer.

12. The composition of claim 11 wherein said oligomer is present in an amount of 0.2 to 7% by weight.

13. The composition of claim 11 wherein said oligomer is present in an amount of 0.2 to 5% by weight.

14. The composition of claim 11 wherein said amide oligomer has a molecular weight no higher than 7,000.

15. The composition of claim 11 wherein the active ends of said amide oligomer are present in an amount no greater than 0.015 mole percent of said formaldehyde segments.

16. The composition of claim 11 wherein the active ends of said amide oligomer are present in an amount no greater than 0.01 mole percent of said formaldehye segments.

17. The composition of claim 11 wherein said amide oligomer is linear.

18. The composition of claim 11 wherein said amide oligomer includes internal linkages derived from caprolactam or laurolactam.

19. The composition of claim 11 wherein said amide oligomer includes internal linkages derived from hexamethylene diamine and diethyl adipate; hexamethylene diamine and dodecanedioic acid; hexamethylene and isophthalic acid; hexamethylene diamine, dodecanedioic acid and caprolactam; or hexamethylene diamine, adipic acid and caprolactam.

* * * * *

UNITED STATES PATENT OFFICE
CERTIFICATE OF CORRECTION

PATENT NO. : 3,960,984
DATED : June 1, 1976
INVENTOR(S) : Melvin Ira Kohan

It is certified that error appears in the above-identified patent and that said Letters Patent are hereby corrected as shown below:

Column 28, line 4 "0.2" should read -- 0.1 --.

Column 28, line 16 "formaldehye" should read -- formaldehyde --.

Signed and Sealed this

Twenty-fourth Day of August 1976

[SEAL]

Attest:

RUTH C. MASON
*Attesting Officer*

C. MARSHALL DANN
*Commissioner of Patents and Trademarks*